Feb. 15, 1944.  A. BOYNTON  2,341,525

FLUID PRESSURE REGULATOR

Filed Aug. 27, 1941

ALEXANDER BOYNTON,
INVENTOR,

BY
Nelson M Moore
ATTORNEYS.

Patented Feb. 15, 1944

2,341,525

UNITED STATES PATENT OFFICE 2,341,525

FLUID PRESSURE REGULATOR

Alexander Boynton, San Antonio, Tex.

Application August 27, 1941, Serial No. 408,519

16 Claims. (Cl. 50—23)

The principal object is to provide a pressure regulator which substitutes an elastic member only for the usual valve and valve seat employed to regulate the flow of pressure fluid.

Another object is to reduce pressure fluid of a relatively high value to a predetermined lesser value by means of a diaphragm employed as the only movable member.

Another object is to employ pressure fluid of a relatively low and variable value in a pipeline or other conduit to cut off the flow of pressure fluid of a higher value through the conduit.

A further object resides in the employment of non-metallic means for the purpose of reducing relatively high pressures to predetermined lesser values.

A still further object is to provide a pressure regulator of fewer parts, greater compactness, and more economical construction than any similar means heretofore devised.

In carrying out the invention, I employ an elastic diaphragm having an extension coacting with two opposed arms of a spring to close a passage for pressure fluid through the diaphragm and the extension whenever pressure of a predetermined low value obtains within the low pressure end of the regulator, this low pressure fluid being employed to manipulate the diaphragm in controlling the pressure. The modified constructions employ a constricted passage into which an extension of the diaphragm is forced to close it in place of the two-armed spring employed for that purpose in the preferred construction; all of which will become more fully understood from an examination of the following specification and the accompanying drawing, in which—

Similar characters of reference are employed to designate similar parts throughout the several views.

Figure 1:
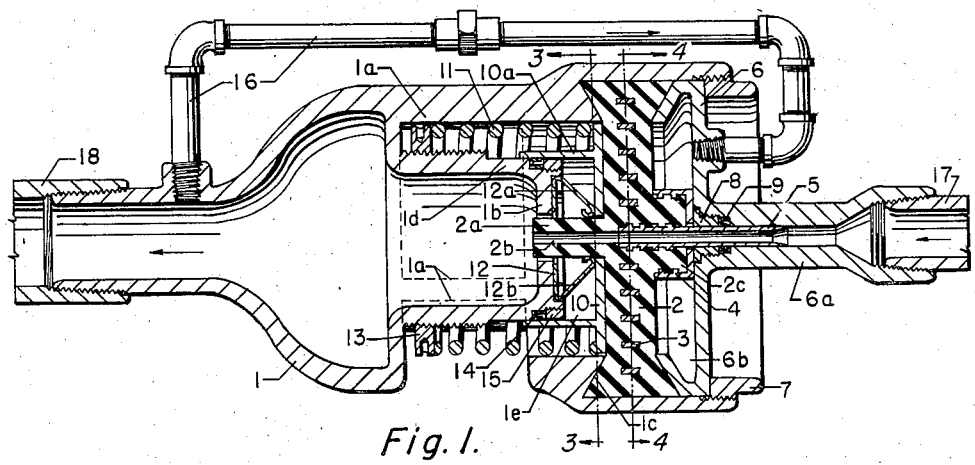
Fig. 1 is mainly a longitudinal section through the preferred embodiment.

Referring specifically to Fig. 1, the shell or body 1, having its opposite tubular ends integral with the connecting arms 1a, which are indicated by dotted lines, has the circular diaphragm 2 hermetically secured upon its internal circular shoulder 1c by the plate member 6 urged against the expanded rim of the diaphragm by the securing ring 7, having threaded engagement within the shell 1. The tube 5, closely slidable within the internal tubular portion 6a of the plate member 6, is secured centrally within the diaphragm and its boss 2c by ring-shaped projections of the tube extending laterally into the diaphragm and by the cap 4 pressed over the outwardly protruding boss. This tube is surrounded closely by the U cup 9 secured within the extension 6a by the U cup retainer ring 8, the U cup being adapted to prevent pressure fluid in the low pressure discharge conduit 18 from contacting the diaphragm. Obviously the tubular portion 6a of the plate member 6 may be considered as a continuation of the high pressure intake conduit 17. This diaphragm has an elastic tubular extension 2a protruding with clearance through the central opening of the internal flange 1b of the shell 1, as appears. The central passage 2b extends centrally through this extension and the diaphragm and continues through the tube 5.

The diaphragm support plate 10 is engaged upon the diaphragm by the diaphragm support spring 11, having its other end engaged by the spring adjusting ring 13 which has threaded engagement over the contracted tubular portion 1d of the shell 1. The shut-off spring 12 is fitted loosely into opposed slots in the internal flange portion 1b of the shell 1. This spring has the two inclined arms 12a and 12b normally contacting the plate 10 and the diaphragm extension 2a which extension protrudes with clearance through the central opening 12c of the shut-off spring. The ring-shaped U cup 14, secured within an annular recess around the internal tubular portion 1d of the shell 1 by the retainer ring 15, has close contact with the tubular extension 10a of the diaphragm support plate 10. This extension is slidable closely over the tubular portion 1d of the shell and prevents escape to atmosphere of pressure fluid out of the downstream chamber 1e under the diaphragm. The value of this fluid, of course, will be the same as that obtaining within the low pressure discharge conduit 18, because the tubular extension 2a of the diaphragm has clearance through the internal flange 1b and through the shut-off spring 12. Atmospheric pressure will act against that portion of the downstream side of the diaphragm and upon that portion of the plate 10 exterior of the inner surface of the tubular extension 10a.

The snail shell-like coiled spring 3 may be vulcanized into the diaphragm for reenforcement and, obviously, wires longitudinal of the extension 2a may be vulcanized into this extension for the same purpose. It will be understood, however, that, while the elastic tubular extension 2a is important, any other type of diaphragm may be employed in connection therewith.

The actuating pressure fluid tube 16, having one end secured to the plate member 6 and the other end connected to the low pressure end of the shell 1, provides bypass communication between the outer upstream side of the diaphragm confronting the chamber 6b within the plate member 6 and the low pressure discharge conduit 18 connected to the shell 1.

The high pressure intake conduit 17, having connection to the internal tubular portion 6a of the plate member 6, communicates with the low pressure discharge conduit 18 by means of the central passage 2b controlled by the shut-off spring 12 acting to compress the elastic tubular diaphragm extension 2a when the diaphragm is flexed in the direction of the diaphragm support spring 11 which will be compressed thereby.

*Operation of Fig. 1*

The regulator illustrated in Fig. 1 being connected between the high pressure fluid intake conduit 17 and the low pressure fluid discharge conduit 18, fluid will flow from the conduit 17 through the passage 2b and into the conduit 18, as indicated by the arrows, until sufficient pressure from the latter conduit is transmitted through the actuating pressure fluid tube 16 to contact the upstream surface of the diaphragm 2 and flex it; thereby compressing the spring 11 and causing the arms 12a and 12b of the shut-off spring 12 to compress the elastic extension 2a of the diaphragm. At a predetermined pressure within the conduit 18, the diaphragm will be flexed enough to cause the ends of the arms 12a and 12b to approach each other and completely close the passage 2b through the elastic extension 2a.

It is apparent that the pressure in the chamber 1e will be the same as that within the chamber 6b, but the atmospheric pressure obtaining on the downstream side of the diaphragm exterior of the tubular extension 10a will allow the diaphragm to be flexed downstream by the pressure acting within the chamber 6b because the latter chamber confronts the entire upstream side of the diaphragm.

Manifestly, the force required to flex the diaphragm and to compress the support spring 11 will determine the pressure required upon the outer or upstream surface of the diaphragm to close the passage 2b. The adjusting ring 13 may be screwed toward the diaphragm to resist its flexing movement. This resistance determines the force necessary to rock the arms of the shut-off spring 12 which, at a predetermined force acting upon the outer surface of the diaphragm, will close the passage 2b. If the adjusting ring 13 be screwed away from the diaphragm, the resistance of the spring 11 to inward flexing of the diaphragm will be lessened, of course, and the value of the low pressure in the conduit 18 will be reduced accordingly. This enables the support spring to be adjusted so that a wide range of low pressures may be made available in the discharge conduit.

Figure 2:
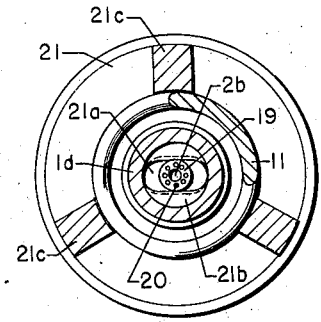
Fig. 2 is a cross section on the line 2—2, Fig. 5.
Figure 3:
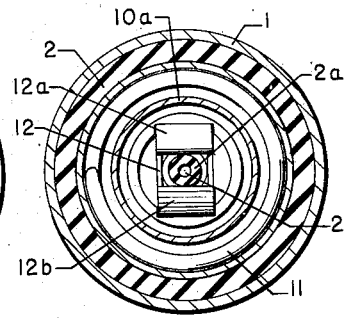
Fig. 3 is a cross section on the line 3—3, Fig. 1.
Figure 4:
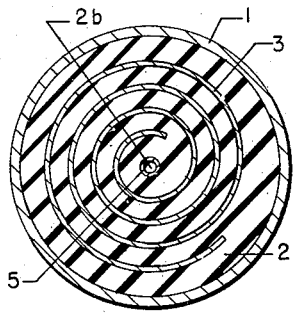
Fig. 4 is a cross section on the line 4—4, Fig. 1.
Figure 5:
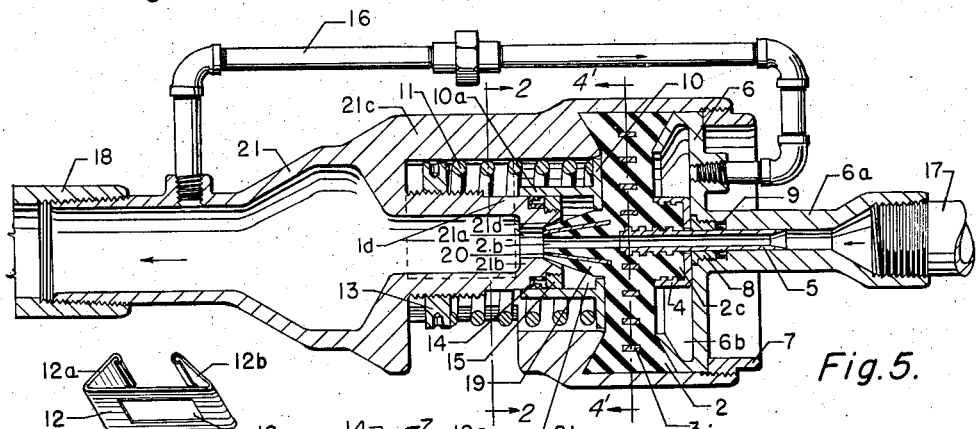
Fig. 5 is mainly a longitudinal section through the first modified construction.
Figure 6:
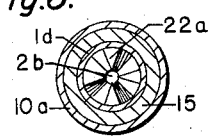
Fig. 6 is a perspective of the two-armed shut-off spring in Fig. 1.

The modified construction illustrated in Figs. 5 and 2 is the same as the preferred embodiment, except that the shut-off spring is omitted and the elastic tubular extension 19 is modified slightly to cause it to close the passage through it by being forced into an oblong opening, the wall of which is formed so as to close the passage through the extension when the diaphragm is flexed a predetermined distance by a predetermined force acting upon the upstream side thereof.

For the reasons stated in the preceding paragraph, all parts will be referred to by the same reference characters that were employed in the preferred construction, except in the few respects wherein the modified construction differs from the preferred embodiment.

The primed section 4'—4' in Fig. 5 is the same in form as the section 4—4 in Fig. 1, but is primed to distinguish it from the unprimed section because one of the parts intersected by these sections is designated by a different reference character from that employed to designate the similar but somewhat different part in the other figure.

Referring specifically to Fig. 5, it will be observed that the shell or body 21 having the connecting arms 21c corresponding to the arms 1a indicated by dotted lines in Fig. 1, is the same as the shell or body 1 in Fig. 1, except that some dimensions are different and that the oblong tapered opening 21a continuing downstream from the funnel-shaped opening 21d through the internal flange 21b is adapted to deform the elastic tubular extension 19 of the diaphragm 2 so as to close the central passage 2b when the diaphragm is flexed far enough to force the elastic extension into the oblong tapered opening 21a a predetermined distance. It will be seen that the elastic tubular extension 19 is preferably tapered, and normally has its smaller end positioned in the funnel-shaped opening 21d at or near the beginning of the oblong tapered opening 21a (see Fig. 2). Consequently, any flexing of the diaphragm downstream or in the direction of the support spring 11 will force the extension 19 into this oblong tapered opening. The downstream taper of this opening necessarily must cause the passage 2b in the tubular extension 19 to become restricted by oblongation, and finally closed as the diaphragm movement continues responsive to pressure exerted upon its outer surface in the chamber 6b, as was explained in connection with Fig. 1.

It will be understood that the reenforcing wires 20 may be vulcanized into the extension 19 of the diaphragm for the purpose of strengthening the extension so that it will not buckle or bend while being forced into the oblong tapered opening 21a.

Manifestly, the compression of the diaphragm support spring 11 may be adjusted by the adjusting ring 13 so as to permit any desired value of fluid under pressure to flow from the high pressure intake conduit 17 into the low pressure discharge conduit 18, and that the pressure in the latter line can be maintained at any desired value, as was explained in connection with the previously described embodiment illustrated in Fig. 1.

Figures 7, 8:
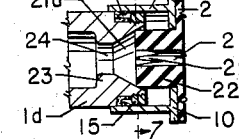
Fig. 7 is a cross section on the line 7—7, Fig. 8.
Fig. 8 is a longitudinal section through a modified closure means adapted to be substituted for the closure means illustrated in Fig. 5.

Referring to the modification illustrated in Fig. 8, the diaphragm 2, shown only partially, is the same as in Figs. 1 and 5, but it has a somewhat different elastic diaphragm extension 22, having the tongues 22a normally engaged upon the funnel-shaped opening 21d formed upon the internal tubular portion 1d, as in Fig. 5, but the uniform opening 24 through the internal flange 23 of said tubular portion is circular instead of oblong, as is the corresponding opening 21a in Figs. 2 and 5.

*Operation of Fig. 8*

When the diaphragm 2 is flexed downstream, the tongues 22a will be forced together by the surface of the funnel-shaped opening 21d, and thus will close the passage 2b, as is apparent. Otherwise, the operation will be the same as was explained for Figs. 1 and 5.

It is understood that the details of construction and arrangement of parts are subject to many obvious variations and minor changes without departing from the scope and purpose of my invention as stated in the objects and as defined by the appended claims.

I claim:

1. In a fluid pressure regulator: a low pressure discharge conduit; a shell connected to said low pressure discharge conduit, said shell having connecting arms and an internal tubular portion with an internal flange thereon; a diaphragm in said shell, said diaphragm having an elastic extension, said diaphragm and extension having a central passage therethrough; reinforcing means in said diaphragm; a plate member in hermetic engagement with said diaphragm and forcing said diaphragm into hermetic engagement with said shell; a high pressure intake line connected to said plate member; a movable diaphragm support plate contacting said diaphragm and having a central opening for said elastic extension and a tubular extension hermetically slidable over said internal tubular portion of said shell, a portion of said plate being exposed to the atmosphere; a shut-off spring upon said internal flange of said internal tubular portion of said shell, said flange having a central opening for said elastic extension, said spring having inwardly inclined arms contacting said support plate and a central opening for said elastic extension, said arms being arranged to compress said elastic extension and close said central passage responsive to a predetermined pressure within said low pressure conduit acting on the side of said diaphragm opposite from said elastic extension; a tube secured in said diaphragm and hermetically slidable in said tubular extension of said plate member, said tube registering with said central passage; a spring surrounding said internal tubular portion of said shell, contacting said support plate and urging said diaphragm toward said plate member; means for adjusting the force of said spring; an upstream chamber between said diaphragm and plate member; a downstream chamber between said support plate and said internal flange; and an actuating pressure fluid tube communicating between the interior of said shell and said upstream chamber.

2. In a fluid pressure regulator: a low pressure discharge conduit; a shell connected to said conduit, said shell having means supporting a diaphragm, a shut-off spring, and a diaphragm support spring; a diaphragm in said shell, said diaphragm having an elastic extension, said diaphragm and extension having a central passage therethrough; a plate member in hermetic engagement with said diaphragm and forcing said diaphragm into hermetic engagement with said shell; a high pressure intake conduit connected to said plate member; a movable diaphragm support plate contacting said diaphragm and having a central opening for said elastic extension; means exposing a portion of said plate to atmospheric pressure; hermetic sealing means between said plate member and shell; a shut-off spring within said shell, said spring having inwardly inclined arms contacting said support plate, said arms being arranged to compress said elastic extension and close said central passage therethrough responsive to a predetermined pressure within said low pressure conduit contacting the opposite side of said diaphragm; a tube secured in said diaphragm, said tube registering with said central passage through said diaphragm and being hermetically slidable in said tubular extension of said plate member; a spring urging said support plate to flex said diaphragm toward said plate member; an upstream chamber between said diaphragm and plate member; a downstream chamber between said support plate and internal flange; and an actuating pressure fluid tube communicating between the interior of said shell and said upstream chamber.

3. In a fluid pressure regulator: a plate; a shell; a diaphragm connected hermetically between said plate and said shell; intake means for high pressure fluid on said plate; discharge means for low pressure fluid on said shell; a tube in said diaphragm, said tube being slidable within said intake means and hermetic therewith, said diaphragm having a central passage therethrough, said passage communicating with said tube; an elastic extension upon said diaphragm, said extension having a passage therethrough registering with said passage through said diaphragm; a shut-off spring mounted to compress said elastic extension and close the passage therethrough at a predetermined pressure of fluid in said discharge line; means exposing part of the downstream side of said diaphragm to atmosphere; and means transmitting said fluid pressure from said discharge conduit to the upstream side of said diaphragm.

4. In a fluid pressure regulator: a plate; a shell; a diaphragm adapted to be connected hermetically between said plate and said shell; intake means for high pressure fluid on said plate; discharge means for low pressure fluid on said shell; a tube in said diaphragm, said tube being slidable within said intake means and hermetic therewith, said diaphragm having a central passage therethrough, said passage communicating with said tube; an elastic extension upon said diaphragm, said extension having a passage therethrough registering with said passage through said diaphragm; a shut-off spring arranged to compress said elastic extension and close the passage therethrough at a predetermined pressure of fluid in said discharge conduit; reinforcing means for said diaphragm; means varying the force required to flex said diaphragm; means exposing a portion of the downstream side of said diaphragm to atmospheric pressure; and means transmitting said fluid pressure from said discharge conduit to the upstream side of said diaphragm.

5. In a fluid pressure regulator: a plate; a shell; a diaphragm adapted to be connected hermetically between said plate and said shell; intake means for high pressure fluid on said plate; discharge means for low pressure fluid on said shell; a tube in said diaphragm, said tube being slidable within said intake means and hermetic therewith, said diaphragm having a central passage therethrough, said passage communicating with said tube; an elastic extension upon said diaphragm, said extension having a passage therethrough registering with said passage through said diaphragm; a shut-off spring arranged to compress said elastic extension and close the passage therethrough at a predetermined pressure of fluid in said discharge means; means exposing a portion of the downstream side of said diaphragm to atmosphere; and means transmitting said fluid pressure from said discharge means to the upstream side of said diaphragm.

6. In a fluid pressure regulator: high and low pressure conduits; a shell connected between said high and said low pressure conduits; a diaphragm in said shell and hermetic therewith, said diaphragm having a central passage and an extension having a continuation of said central passage therethrough; a tube secured to said diaphragm and slidable hermetically in said high pressure conduit, said tube providing communication between said high pressure conduit and said passage; means to close said extension upon flexing of said diaphragm; resilient means urging said diaphragm toward said high pressure conduit; means exposing a portion of the downstream side of said diaphragm to atmosphere; and means transmitting pressure from said low pressure conduit to said diaphragm, whereby said diaphragm is flexed and said passage closed at a predetermined pressure.

7. In a fluid pressure regulator: high and low pressure conduits; a shell connected between said high and said low pressure conduits; a diaphragm in said shell and hermetic therewith, said diaphragm having a central passage and a deformable extension having a continuation of said central passage therethrough; hermetic means for connecting said high pressure conduit with said shell; hermetic movable means for fluid communication between said high pressure conduit and said central passage; means adjacent said extension to close said extension by deformation upon flexing of said diaphragm; means resiliently urging said diaphragm toward said high pressure conduit; means exposing a portion of the downstream side of said diaphragm to atmosphere; and a conduit transmitting pressure from said low pressure conduit to said diaphragm to flex the same and close said passage.

8. In a fluid pressure regulator: high and low pressure conduits; a diaphragm hermetically interposed between said high and low pressure conduits, said diaphragm having a passage therethrough; a plate member hermetically interposed between one side of said diaphragm and said high pressure conduit; a shell hermetically connected between the other side of said diaphragm and said low pressure discharge conduit; an upstream chamber between said diaphragm and said high pressure conduit; a downstream chamber in said shell, said downstream chamber being of less diameter than that of the upstream chamber; movable hermetic means between said passage and said high pressure conduit; shut-off means operable to close said passage, said means being responsive to fluid pressure in said upstream chamber; means exposing a portion of the downstream side of said diaphragm to atmospheric pressure; and a conduit transmitting such downstream pressure from said shell to said upstream chamber.

9. In a fluid pressure regulator: a plate; a shell; a diaphragm mounted hermetically between said plate and said shell; reinforcing means for said diaphragm; intake means for high pressure fluid on said plate; discharge means for low pressure fluid on said shell; a tube in said diaphragm, said tube being slidable within said intake means and hermetic therewith, said diaphragm having a central passage therethrough, said passage communicating with said tube; a tapered and reinforced elastic extension upon said diaphragm, said extension having a passage therethrough registering with said passage through said diaphragm; an oblong tapered opening continuing downstream from within a funnel-shaped opening within said shell, the walls of said continuous opening being arranged to deform said elastic extension and close the passage therethrough at a predetermined fluid pressure in said discharge means; means upon said shell varying the force required to flex said diaphragm; means exposing a portion of the downstream side of said diaphragm to atmospheric pressure; and means for transmitting fluid pressure from said discharge conduit to the side of said diaphragm opposite said low pressure discharge.

10. In a fluid pressure regulator: a plate; a shell; a diaphragm mounted hermetically between said plate and said shell; intake means for high pressure fluid on said plate; discharge means for low pressure fluid on said shell; a tube in said diaphragm, said tube being slidable within said intake means and hermetic therewith, said diaphragm having a central passage therethrough, said passage communicating with said tube; an elastic extension upon said diaphragm, said extension having a passage therethrough registering with said passage through said diaphragm; an oblong opening and a funnel-shaped opening in combination, said oblong opening continuing downstream from said funnel-shaped opening within said shell, the wall of said oblong opening being arranged to flatten said elastic extension and close the passage therethrough at a predetermined pressure of fluid in said discharge conduit; a support spring means acting on said diaphragm for varying the force required to flex said diaphragm; means exposing a portion of the downstream side of said diaphragm to atmospheric pressure; and means transmitting fluid pressure from said discharge conduit to the opposite side of said diaphragm.

11. In a fluid pressure regulator: a shell; a plate; a diaphragm connected hermetically between said plate and said shell; intake means for high pressure fluid mounted on said plate; discharge means for low pressure fluid mounted on said shell; a tube in said diaphragm, said tube being slidable within said intake means and hermetic therewith, said diaphragm having a central passage therethrough, said passage communicating with said tube; an elastic extension upon said diaphragm, said extension having a passage therethrough registering with said passage through said diaphragm; tongues on said elastic extension; a funnel-shaped opening and a uniform circular opening in combination through said shell, said circular opening continuing downstream from within said funnel-shaped opening, the wall of said funnel-shaped opening being constructed and arranged to force inward said tongues, and close said passage at a predetermined pressure of said fluid in said low pressure discharge conduit; means exposing a portion of the downstream side of said diaphragm to atmosphere; and means transmitting fluid pressure from said low pressure discharge conduit to the upstream side of said diaphragm.

12. In mechanism employing relatively low pressure to close a passage for relatively high pressure fluid through a diaphragm: a diaphragm; means for hermetically sealing said diaphragm between a volume of high pressure fluid and a volume of low pressure fluid; means isolating both sides of said diaphragm from said high pressure fluid; means for exposing one side of said diaphragm to said low pressure fluid; means for exposing the other side of said diaphragm partially to said low pressure fluid and partially to atmospheric pressure.

13. As an article of manufacture: a flexible diaphragm having an elastic extension adjacent the center of said diaphragm and said diaphragm and said extension having a passage therethrough arranged to be closed by pressure on the walls of said extension.

14. As an article of manufacture: a diaphragm having a elastic extension adjacent the center of said diaphragm formed into tongues and having an opening therethrough, said extension being tapered whereby to cooperate with a valve seat means and close said opening as said diaphragm is flexed in the direction of said extension.

15. A fluid flow control device comprising: a housing; a low pressure and a high pressure conduit connected to said housing; a member mounted on said housing and movable in response to fluid pressure in said low pressure conduit; means carried by said housing conveying fluid from one conduit to the other, said member controlling the effective cross-sectional area of said means and the fluid flow therethrough said member being activated by said means conveying fluid.

16. A fluid flow control device comprising: a housing having a funnel-shaped opening; a low pressure conduit and a high pressure conduit connected to said housing; a tube slidable in said high pressure conduit and movable responsive to fluid pressure in said low pressure conduit; and a diaphragm having a downstream extension thereon, said diaphragm having its periphery secured hermetically upon said housing and having a passage communicating through said extension and with said high and low pressure conduits, said tube being secured upon said diaphragm and being movable thereby, said downstream extension being compressible by the wall of said funnel-shaped opening when said diaphragm is flexed downstream, whereby fluid flow from said high pressure conduit into said low pressure conduit is controlled.

ALEXANDER BOYNTON.